United States Patent [19]

Henne et al.

[11] 4,264,029

[45] Apr. 28, 1981

[54] COMPOUND MATERIAL AND METHOD FOR PRODUCING SAME

[75] Inventors: Rudolf Henne, Böblingen; Rolf Prümmer, Gundelfingen, both of Fed. Rep. of Germany

[73] Assignee: Deutsche Forschungs- und Versuchsanstalt für Luft- und Raumfahrt e.V., Munich, Fed. Rep. of Germany

[21] Appl. No.: 66,452

[22] Filed: Aug. 14, 1979

[30] Foreign Application Priority Data

Aug. 16, 1978 [DE] Fed. Rep. of Germany ....... 2835869

[51] Int. Cl.³ .............................................. B23K 21/00
[52] U.S. Cl. .................................... 228/108; 228/107
[58] Field of Search .................... 228/107, 108, 109

[56] References Cited

U.S. PATENT DOCUMENTS

| | | | |
|---|---|---|---|
| 3,091,848 | 6/1963 | Frank | 228/219 X |
| 3,137,937 | 6/1964 | Cowan et al. | 228/108 |
| 3,563,713 | 2/1971 | Rudd | 228/107 |
| 3,583,062 | 6/1971 | Sharp, Jr. et al. | 228/108 |
| 3,728,780 | 4/1973 | Chang | 228/108 |

FOREIGN PATENT DOCUMENTS 2343885 11/1977 Fed. Rep. of Germany .

OTHER PUBLICATIONS

Doherty, A. E., et al., "Practical Applications of Explosive Welding" 2nd Int'l Conference of The Center for Herf, Estes Park, Colo; pp 7.4.2–7.4.4, 7.4.6–7.4.32, (1969).

*Primary Examiner*—Richard B. Lazarus
*Attorney, Agent, or Firm*—Laubscher & Laubscher

[57] ABSTRACT

A compound material for temperatures up to about 1250° C. or 1350° C., respectively, and a method for producing the same, are disclosed, including a pair of joined layers one of which is a corrosion- and high-temperature-resistant alloy, the other layer consisting of a refractory material with high strength at high temperatures. The layer having the weaker mechanical strength at high temperatures is thinner than the other layer, the ratio of layer thickness preferably being between 1:5 and 1:2. A further alloy layer may be provided on the opposite side of the refractory layer, thereby to define a three-layer laminate. A thin layer of diffusion barrier material, such as platinum or palladium, may be provided between the refractory and alloy layers. The method for producing the laminate includes the step of detonating an explosive layer to exposively clad the alloy layer on to the refractory layer.

11 Claims, 2 Drawing Figures

COMPOUND MATERIAL AND METHOD FOR PRODUCING SAME

STATEMENT OF THE INVENTION

This invention relates to a compound material for temperatures of up to about 1250° C. or about 1350° C., respectively, and to a method for producing the same.

BRIEF DESCRIPTION OF THE PRIOR ART

For different applications, such as heat exchangers, heated chemical reactors, thermionic energy converters with solar or flame heating means, or for receivers for solar thermal power plants, materials should be available which are chemically and mechanically stable at temperatures up to about 1250° C. or up to about 1350° C., respectively. Such materials should not react with diffused gases and should not form for example, hydrides. They must be leak tight and especially with regard to hydrogen, nitrogen, and carbon monoxide possess the smallest possible gas permeation rate. Further requirements placed on such materials are that they possess a high thermal conductivity, and, on at least one side, are resistant both to scaling at about 1300° C. and to hot corrosive flame gases, and further, on at least one side are chemically resistant, for example, against molten metals such as sodium, potassium, caesium or lithium. Finally, there is the further requirement that these matals must possess a very low vapor pressure value, so that the inner surfaces of evacuated devices will not be contaminated by vaporization of these materials.

The conventional materials of the prior art fail to meet all of the above requirements. Of course, certain known materials do provide a few of the required characteristics. Thus, high-temperature-resistant iron, nickel and chromium base alloys (so called "super alloys") are known, which are relatively easily produced and are corrosion resistant up to temperatures of a maximum of 1350° C. because of a very stable superficial oxide coating. As a consequence of this superficially oxidized surface, the hydrogen diffusion rate is reduced. However, this material has the disadvantage that it possesses only small mechanical strength at operating temperatures, has an undesirable high thermal coefficient of expansion, low electrical conductivity, and a high vapor pressure value (i.e., a high evaporation rate).

On the other hand, a group of refractory materials with high strength at high temperatures is known, for example, tungsten, molybdenum, tantallum niobium, or alloys of these metals, which possess a sufficient mechanical strength at the operating temperatures, a relatively small coefficient of thermal expansion, a small vapor pressure, and good thermal and electrical conductivities. However, these refractory materials are not corrosion-resistant at the desired operating temperatures.

In order to avoid these disadvantages, it has been proposed to coat refractory materials with protective layers, for example, with a layer of molybdenum disilicide on molybdenum, whereby the protective layer is applied by means of plasma spraying. In addition to the additional expense resulting from this method, it also gives the disadvantage that such protective layers are not absolutely tight and therefore require subsequent retreatment. Furthermore, it is extremely difficult to produce a fault-free joining of the protective layer with the refractory material within a large area, so that cracks and separations are produced within which corrosive reaction of the refractory material commences.

SUMMARY OF THE INVENTION

In accordance with a primary object of the present invention, a material is provided which possesses the previously itemized desired characteristics, which is chemically and mechanically stable at operating temperatures of up to about 1250° C. or to about 1350° C., respectively, is corrosion-resistant, substantially gas impermeable, has good electrical and thermal conductivity, and on at least one side thereof has a small evaporation rate.

According to a more specific object of the invention, a compound material is provided which includes at least two layers, one of the layers being a corrosion- and high-temperature-resistant nickel, iron, or chromium-base alloy (for example, a high-temperature-resistant super alloy), and the other layer being a refractory material.

One obtains in this manner a material which possesses the required characteristics. The refractory material, which has the required mechanical strength particularly at the operating temperatures, serves as the support material for the mechanically weak iron, nickel, or chromium base alloy, while these super alloys protect the layer of refractory material against corrosion.

One problem resulting from such a joining of layers is that of a different thermal coefficients of expansion of the materials. In order to overcome this problem, it is proposed in accordance with a preferred embodiment of the invention, to cause the thickness of the material having the smaller mechanical rigidity at high temperatures to be less than that of the other material.

Consequently, a relatively thicker layer of refractory material is joined to a thinner layer of iron, nickel, or chromium base alloy. In this way it is possible to reduce the thermal expansion of the alloy, which is originally relatively great, essentially to the thermal expansion of the refractory support material. In this manner, the iron, nickel, or chromium base alloy "flows" at the high operating temperatures, so that this layer conforms with the refractory material, without separation from this refractory support layer. The resulting thermal coefficient of expansion of the laminate thereby approximates rather closely that of the refractory material.

According to another object of the invention, a method is provided for producing the compound material. In accordance with the method of the present invention, the iron, nickel, or chromium base alloy is welded to the layer of refractory material by means of an explosive cladding technique, whereby the base alloy coating plate is initially arranged adjacent, parallel with and spaced from the refractory support plate, and an explosive layer is arranged on the side of the coat plate remote from the refractory base plate, the explosive layer being so dimensioned that the collision velocity $v_k$ is between about 2700 and 3500 m/sec, and the collision angle $\beta$ is between 15° and 25°.

The bonding of these totally different materials is extraordinarily difficult by conventional means. A bond such as a brazed or soldered bond has stresses because of the quite different expansion values so that the joined materials are caused to tear and partly separate during cooling. Furthermore, it is difficult to develop and apply a solder material having a melting point that is greater than 1300° C. but is less than the critical temperature (i.e., the melting temperature or the eutectic temperature) of the high temperature alloy layer of the laminate. By a combination of a nickel base alloy with molybdenum, the critical temperature is at about 1315° C. and with an iron base alloy with molybdenum, this temperature is at about 1375° C. Furthermore, it is difficult to avoid during soldering the formation of brittle intermetallic phases, and to guarantee the required strength of the solder during longer operating times.

Owing to the explosive cladding process of the invention one obtains a very short interaction time whereby only the surfaces of both components are in a quasi-fluid condition so that the formation of intermetallic phases can be avoided in the interface. This makes it possible to obtain a reliable joining of the components. Consequently, a characteristics wave-formed interlocking is obtained.

It is beneficial to use the refractory material in a deep drawable condition, as rolled, for example, in different directions.

Preferably, prior to the explosion plating step, the hardness of the iron, nickel, or chromium base layer and/or the refractory material is reduced, for example, by annealing. Preferably, the surfaces of the materials which are to be combined are treated to remove any oxide layer thereon.

It is also advantageous to heat the refractory layer during the explosion plating process, for example, to a temperature of between about 300° C. to about 500° C., preferably about 400° C. This heating serves to increase the ductility, to reduce the hardness and to avoid cracks or tears, since the difficulties of the explosive cladding method become smaller with decreasing hardness of the materials to be joined.

Preferably the explosion plating of the heated refractory material is conducted in an inert atmosphere, preferably a $CO_2$ atmosphere, thereby preventing the occurrence of oxidation of the surfaces of the layers.

In order to overcome the difficulties produced by the different thermal coefficients of expansion of the different materials, it is proposed in accordance with a further embodiment of the invention to cause the thickness of the material having the smaller mechanical strength at high operating temperatures to be less than that of the other material.

Preferably, it is desirable to roll down the compound material after the explosive plating bonding step. In this manner it is possible to obtain a layer thickness which could not otherwise be achieved solely by joining through explosive plating. Furthermore, the integrity of the bond remains stable after subsequent rolling of the product.

It is also advantageous if, prior to the explosion plating step, a thin metal foil layer is positioned between the base alloy layer and the layer of refractory material. In this manner the bond characteristic of the compound material is improved, since this intermediate layer serves as a diffusion barrier. This intermediate layer of material must exhibit a high melting point and should not show eutectic reactions with the layers of the laminate up to operating temperatures. Preferably the intermediate layer is formed of platinum or palladium.

The refractory material could consist essentially of tungsten, molybdenum, tantalum, and niobium, as well as alloys of these metals, particularly also titanium zirconium-stabilized molybdenum (TZM). The iron, nickel, or chromium base alloys are high-temperature-resistant alloys, consisting predominantly of iron, nickel, or chromium with additives of aluminum, molybdenum, vanadium, or chromium. For instance, in accordance with the present invention, a compound material from molybdenum and one of the following base alloys is produced:

(1) nickel-base alloy "Inconel 601" comprising:

| | |
|---|---|
| 60% | nickel |
| 14% | iron |
| 23% | chromium |
| 1.4% | aluminum |
| 1.6% | remaining additives |

(2) iron-base alloy "Kanthal Al" comprising:

| | |
|---|---|
| 72% | iron |
| 22% | chrome |
| 5.5% | aluminum |
| 0.5% | cobalt |

The layer thickness proportions between the high-temperature-resistant alloy on the one hand and the refractory material on the other hand can, in accordance with the present invention, preferably be between 1:2 and 1:5, although different layer thicknesses are possible.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
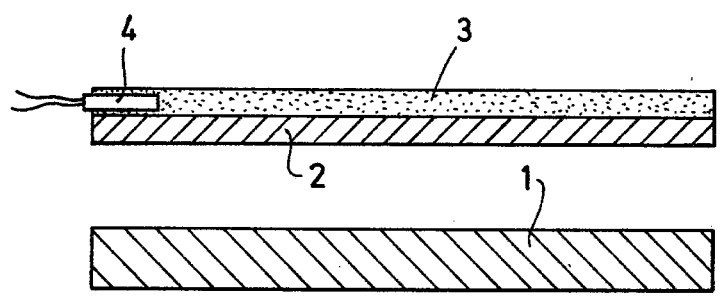
FIG. 1 is a schematic illustration of the arrangement of the layers prior to the explosion plating step.
Figure 2:
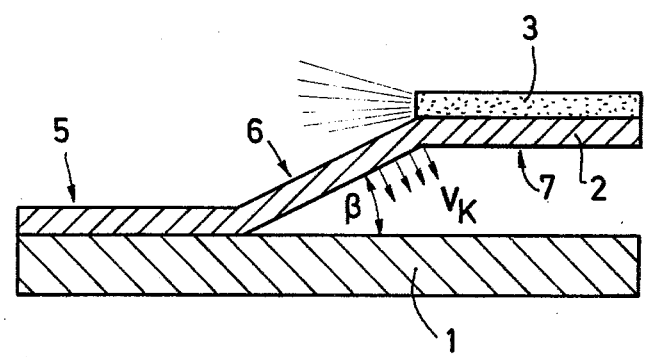
FIG. 2 is a schematic illustration of the explosion plating method during the procedure.

Referring now to the drawings, the base plate 1 is formed of a refractory material, for example, molybdenum, and arranged in parallel spaced relation thereto is the coat plate 2 which is formed from iron, nickel, or chrome base alloy (high-temperature-resistant super alloy), such as a plate from 60% nickel, 14% iron, 23% chromium, and 1.4% aluminum (Inconel 601, material No. 2.4851 according to DIN 17744 and DIN 17750) or from 72% iron, 22% chromium, 5.5% aluminum, and 0.5% cobalt (Kanthal Al). Arranged on the side of the coat plate 2 remote from the refractory base plate 1 is a layer 3 of explosive material in which is arranged the detonator 4. FIG. 2 illustrates schematically the explosion plating operation produced when the explosive layer 3 is detonated by the detonator 4. In the first region 5 in which the explosion has already occurred, the coat plate 2 has been accelerated towards and welded to the base plate 1. In the middle region 6, in which the explosion has just occurred, the coating layer 2 is progressively accelerated towards the base plate 1 and collides with same angle $\beta$, which, according to the invention lies between 15° and 25°. In this region, the coat plate successively comes into intimate contact with the base plate, whereby the materials behave hydrodynamically, fluid at their surfaces and an intimate bond is achieved. In the third region 7, the explosion has not yet taken place. The explosive layer 3 is so dimensioned that the collision velocity $v_k$ is between 2700 and 3500 m/sec. In the illustrated embodiment, only one side of the ground plate 1 is coated with a layer of iron, nickel, or chromium base alloy. It is possible, however, to also provide a three layer compound material in which a layer of high-temperature-resistant base alloy is provided on both sides of the base plate 1. This joining of layers can occur simultaneously or successively.

It is also possible to provide an intermediate layer (not shown) between the refractory layer 1 and the alloy coat layer 2, which intermediate layer may be formed of platinum or palladium to serve as a diffusion barrier, thereby improving the bond characteristics between the layers. By the use of such an intermediate layer having a thermal coefficient of expansion which is between that of the refractory material and that of the high-temperature-resistant super alloy material, the problem resulting from the alloy and refractory layers having different coefficients of thermal expansion can be further reduced.

In this manner, a compound material can be produced which may be subsequently rolled to produce a desired layer thickness.

While in accordance with the provisions of the Patent Statutes the preferred form and embodiments of the invention have been illustrated and described, it will be apparent that changes and modifications can be made without deviating from the inventive concepts set forth above.

What is claimed is:

1. A method for producing a compound material for operating temperatures of from about 1250° to about 1350° C., which comprises the steps of
   (a) arranging adjacent generally parallel with and spaced from a layer of refractory material a layer of a high-temperature-resistant super alloy selected from the group consisting of nickel, iron and chromium base alloys; and
   (b) detonating a layer of an explosive charge adjacent the alloy layer to explosively plate the same upon the layer of refractory material, thereby to produce a joined laminate including a base plate formed of refractory material and a parallel coat plate formed of a high-temperature-resistant base alloy, the layer of explosive charge being so dimensioned and arranged as to produce a collision velocity ($V_K$) of alloy layer of from about 2700 to about 3500 m/sec. and a collision angle ($\beta$) of from about 15° to about 25°.

2. The method defined in claim 1, wherein the material of the refractory layer is in deep drawable condition.

3. The method defined in claim 1, and further including the preliminary step, prior to the detonating step, of reducing the hardness of the refractory layer, the alloy layers, for example or all of them, by annealing.

4. The method defined in claim 1, and further including the preliminary step, prior to the detonating step, of removing oxide layers from the surface of the layers adjacent to each other.

5. The method defined in claim 1, wherein the thickness of the layer of material which is mechanically weaker at the operating temperature is less than that of the other layer.

6. The method defined in claim 1, and further including the final step, after the explosion plating step, of rolling the resultant laminate.

7. The method defined in claim 1, and further including the intermediate step, prior to the explosion plating step, of arranging a thin metal foil layer between the alloy and refractory layers.

8. The method defined in claim 1, and further including the preliminary step, prior to the explosion plating step, of heating the layer of refractory material.

9. The method as defined in claim 8, wherein the layer of refractory material is heated to a temperature of from about 300° C. to about 500° C.

10. The method as defined in claim 9, wherein the layer of refractory material is heated to about 400° C.

11. The method as defined in claim 8, wherein the explosion plating step is conducted in a carbon dioxide atmosphere.

* * * * *